United States Patent [19]
Fradenburgh et al.

[11] Patent Number: 5,253,979
[45] Date of Patent: Oct. 19, 1993

[54] VARIABLE DIAMETER ROTOR HAVING AN OFFSET TWIST

[75] Inventors: Evan A. Fradenburgh, Fairfield; S. Jon Davis, Orange; Robert C. Moffitt, Seymour; Joseph A. Visintainer, Beacon Falls, all of Conn.

[73] Assignee: United Technologies Corporation, Stratford, Conn.

[21] Appl. No.: 891,577

[22] Filed: Jun. 1, 1992

[51] Int. Cl.$^5$ .............................................. B64C 11/16
[52] U.S. Cl. ................................. 416/223 R; 416/87; 416/89; 416/226
[58] Field of Search ..................... 416/87, 88, 89, 101, 416/226, 223 R, 239

[56] References Cited

U.S. PATENT DOCUMENTS

| | | | |
|---|---|---|---|
| 2,450,440 | 10/1948 | Mills | 416/223 R |
| 3,173,490 | 3/1965 | Stuart III | 416/223 R |
| 3,713,751 | 1/1973 | Fradenburgh et al. | 416/87 |
| 3,768,923 | 10/1973 | Fradenburgh | 416/226 |
| 3,829,240 | 8/1974 | Edenborough et al. | 416/223 R |
| 3,884,594 | 5/1975 | Fradenburgh . | |
| 4,007,997 | 2/1977 | Yarm . | |
| 4,074,952 | 2/1978 | Fradenburgh et al. . | |
| 4,080,097 | 3/1978 | Hager et al. . | |
| 4,137,010 | 1/1979 | Stroub | 416/89 |
| 4,142,697 | 3/1979 | Fradenburgh . | |
| 4,248,572 | 2/1981 | Fradenburgh . | |
| 4,655,685 | 4/1987 | Fradenburgh . | |

FOREIGN PATENT DOCUMENTS

1059072  4/1952  France .................................. 416/87

OTHER PUBLICATIONS

PCT/US90/04288, Int. Filing date 31 Jul. 1990.

Primary Examiner—Edward K. Look
Assistant Examiner—Mark Sgantzos
Attorney, Agent, or Firm—McAulay Fisher Nissen Goldberg & Kiel

[57] ABSTRACT

A variable diameter rotor for a tilt rotor aircraft has an inboard section having a linear twist from a root end to an outboard end thereof, and an outboard section telescoped over the inboard section which additionally has a linear twist from a root end to an outboard end thereof. The outboard section is disposed at an offset of about 4° to 15° relative to the inboard section to provide a step wise change in twist angle when in the extended condition, such that the rotor when operated in the helicopter mode, can be operated at high blade pitch angles without premature stalling along the inboard airfoil surfaces This allows efficient operation at high thrust coefficient/solidarity ratios. Optionally, the trailing edge of the outboard section is rotated along the aft 30% of chord of the airfoil section to provide an equivalent twist increase in the offset at the transition between the blade sections. When in the forward flight cruise mode, the inboard equivalent twist increment allows operation of the inboard airfoil sections at higher pitch angles to reduce negative lift regions and increase cruise propulsion efficiency.

9 Claims, 6 Drawing Sheets

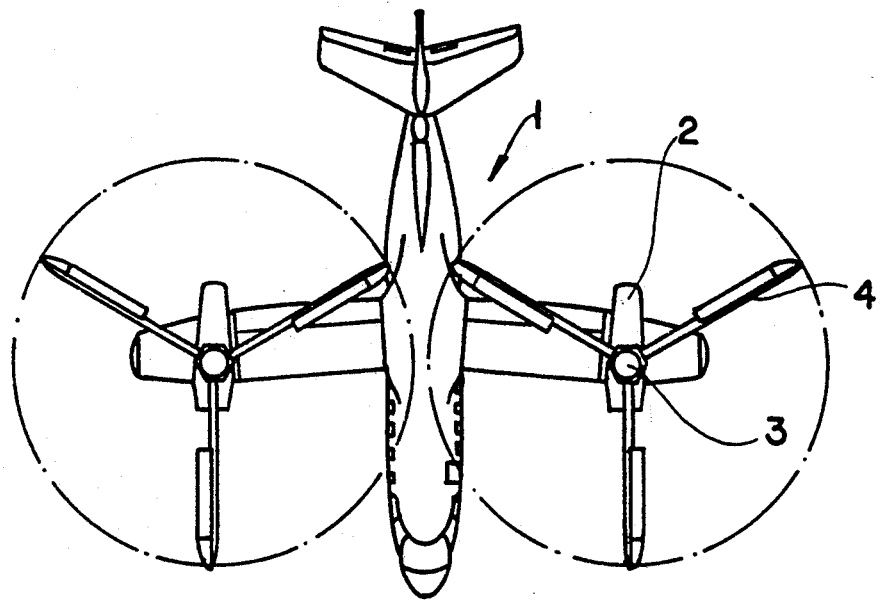
FIG. 1B
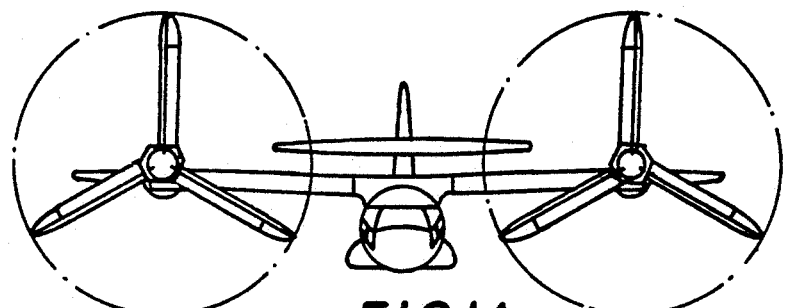
FIG. 1A
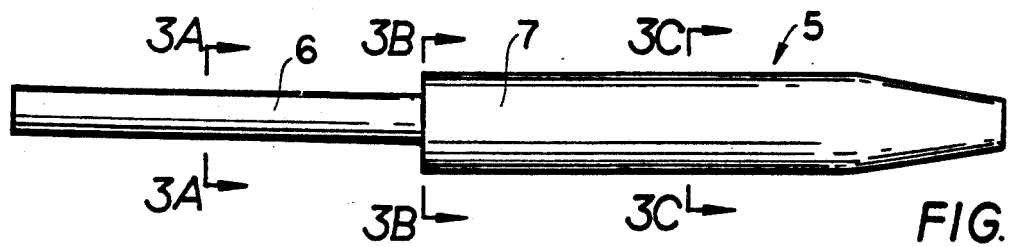
FIG. 2
PRIOR ART
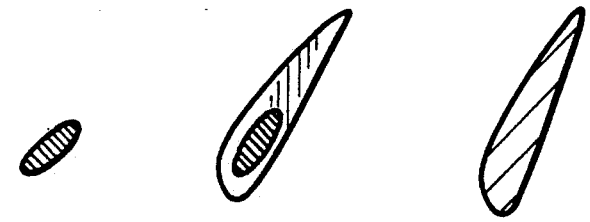
FIG. 3A
PRIOR ART
FIG. 3B
PRIOR ART
FIG. 3C
PRIOR ART

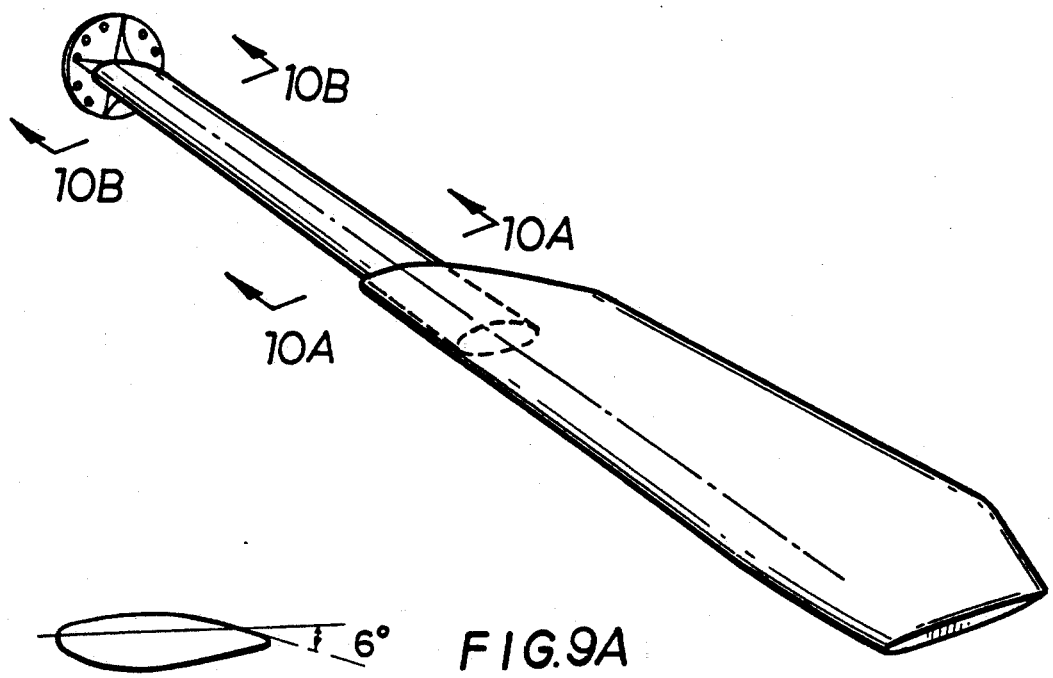
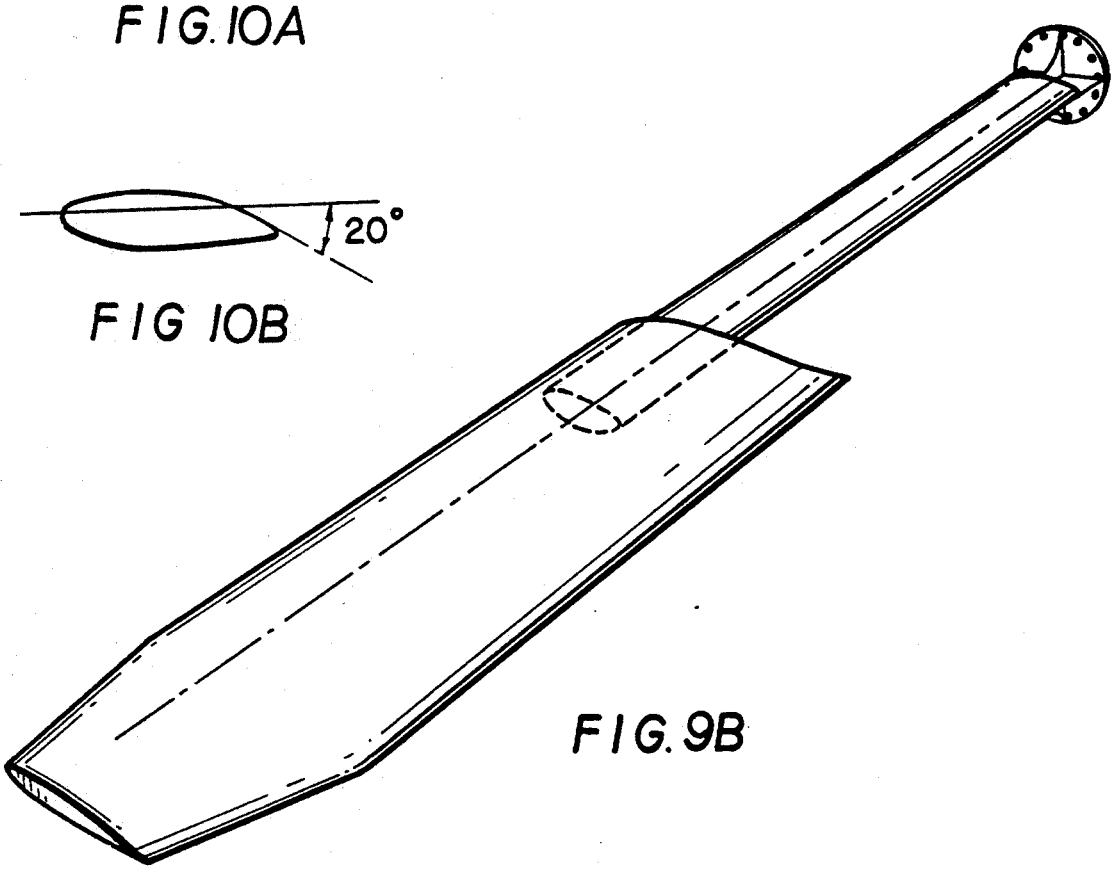
FIG.9A
FIG.10A
FIG.10B
FIG.9B

VARIABLE DIAMETER ROTOR HAVING AN OFFSET TWIST

TECHNICAL FIELD

This invention relates to tilt rotor aircraft having variable diameter rotors and more particularly to a variable diameter rotor having an offset twist in its extended condition to provide enhanced performance.

BACKGROUND

A tilt rotor aircraft is one which typically has a pair of tiltable pods containing an engine and rotor system supported on 15 aircraft wings. The pods are movable between a vertical position when the engine driven rotors serve as helicopter rotors for vertical take off and landing, and a horizontal position where the rotors serve as propellers for forward flight.

Typically, tilt rotor aircraft in operation today utilize a fixed diameter rotor system that represents a distinct design compromise between the requirements for hover and the requirements for high speed cruise. Because the rotor thrust in hover must lift the entire gross weight, the rotors are grossly over sized for cruise a flight regime, where the wings carry the weight and the rotor thrust required for propulsion is only a small fraction of the gross weight. Conversely, the rotors are undersized for the helicopter mode, a compromise to the cruise mode size requirement, and this results in an undesirable high disk loading in hover. Disk loading trends for conventional tilt rotors are on the order of twice that for conventional helicopters for a given gross weight, resulting in high hover power consumption, reduced hover endurance, and excessive downwash velocities.

Lift efficiency (lift per unit of engine power) decreases as disk loadings are increased. Most helicopters operate at disk loadings that are less than 10 psf to achieve reasonable lift efficiency and to maintain acceptable downwash velocity in the rotor wake. Disk loadings of about 14 psf or higher result in downwash velocities of hurricane proportion. Present tilt rotor aircraft have disk loadings in the range of about 15-25 psf. For a tilt rotor, downwash velocities are further accelerated in the plane of symmetry along the fuselage due to the interference effects of side by side rotor arrangements. Another disadvantage of high disk loadings is that the autorotation characteristic in a helicopter mode is badly degraded. The autorotative rate of descent will be high and the stored rotor kinetic energy available to cushion touch down will be relatively low. Thus, while helicopters can land safely without power, it is unlikely that conventional tilt rotors will be able to do so.

The preceding section describes how a large rotor diameter is an advantage for operating the aircraft in the helicopter mode as it provides for low disk loading which results in efficient operation, low noise levels and diminished downwash velocities. On the other hand, a relatively small diameter is an advantage in the propeller mode to reduce tip speed and blade area for improved propulsive efficiency, minimized blade aeroelastic response to the air loads encountered and for simplified ground handling. One method for accommodating these conflicting requirements is to use a variable diameter rotor.

By utilizing a variable diameter rotor, the rotor can be operated at maximum diameter in hover for efficiency and low disk loading operation, and then the diameter can be decreased by any amount up to about 40% for high speed cruise in the airplane mode, reducing both tip speed and blade area. Thrust capability is much more nearly balanced to the cruise requirements with no need for the large rpm reduction required by conventional tilt rotors.

Telescoping variable diameter blades are those with two or more rigid segments per blade that can be telescoped with respect to each other to vary rotor diameter. Retraction ratios vary depending upon the number of telescoping segments. The simplest configuration, with two radial segments, can achieve a retraction ratio of approximately 1.8 to 1. A variety of mechanisms have been proposed to retract these blades, including cables and straps, screw drives, compressible and incompressible hydraulic systems, rack and piston gearing, plus various forms of rigid mechanical rods. Telescoping has the advantage that it allows retraction at full rotational speed without introducing significant bending loads in any direction. Reduction of rotor radius with a two segment telescoping blade is more than adequate to accommodate high speed tilt rotor aircraft.

Various mechanisms have been proposed for providing variable diameter rotors. For example, U.S. Pat. Nos. 4,142,697, 3,884,594 and 3,713,751 disclose telescoping outer blade portions which are movable over inner blade sections. However, while providing variable diameter capability, such designs have incorporated compromises in that, to accommodate the extension and retraction of one blade section over another, the blade twist must be linear throughout its entire length. Linear twist blades are not optimally efficient as, at high thrust coefficient/solidity ratios, the inboard airfoil section experiences a premature stall condition in hover flight. Also, in forward flight, large regions of negative lift are created on the inboard blade sections, which decreases cruise efficiency.

SUMMARY OF THE INVENTION

It is an object of the present invention to provide a variable diameter rotor with improved efficiency in hover flight.

It is another object to provide a variable diameter rotor with improved efficiency in forward cruise flight.

These and other objects of the present invention are achieved by providing a variable diameter rotor for an aircraft comprising an inboard section, an outboard section, means for telescoping the outboard section relative to the inboard section for varying the rotor diameter, the inboard section having a twist which increases linearly from a root end to an outboard end thereof, the outboard section having a twist which is linear from the root section to an outboard section thereof, the twist of the inboard and outboard sections being offset relative to each other by from 4°-20°. This offset may be obtained by modifying an outboard section blade receiving chamber to induce an offset at the interface between the inboard and outboard section. Optionally, the outer skin of the outboard rotor section is modified to produce an equivalent positive twist increment. Preferably, this is obtained by rotation of the aft 30% of chord of the airfoil section through a specified angle, the deflection being a maximum at the blade root and tapering linearly to 0° at a blade spanwise station. Typically, a deflection of about 5° is used.

When the blade is extended for hover mode operation, the inboard twist offset permits operation at high blade pitch angles without premature stalling, thus allowing efficient operation at high thrust coefficient/solidity ratios. When in the forward flight cruise mode, the equivalent twist increment allows operation of the inboard airfoil sections at higher pitch angles to reduce negative lift regions and increase cruise propulsive efficiency.

BRIEF DESCRIPTIONS OF THE DRAWINGS

FIGS. 1a and 1b, are views of an aircraft having a pair of rotors shown retracted in FIG. 1a for forward flight and extended in FIB. 1b for hover mode flight.

FIG. 2 is a view of a prior art blade in cross-section showing the constant linear twists from the root to the outboard end.

FIGS. 3a, b and c are cross-sectional views of the blade of FIG. 2.

Figure 4:
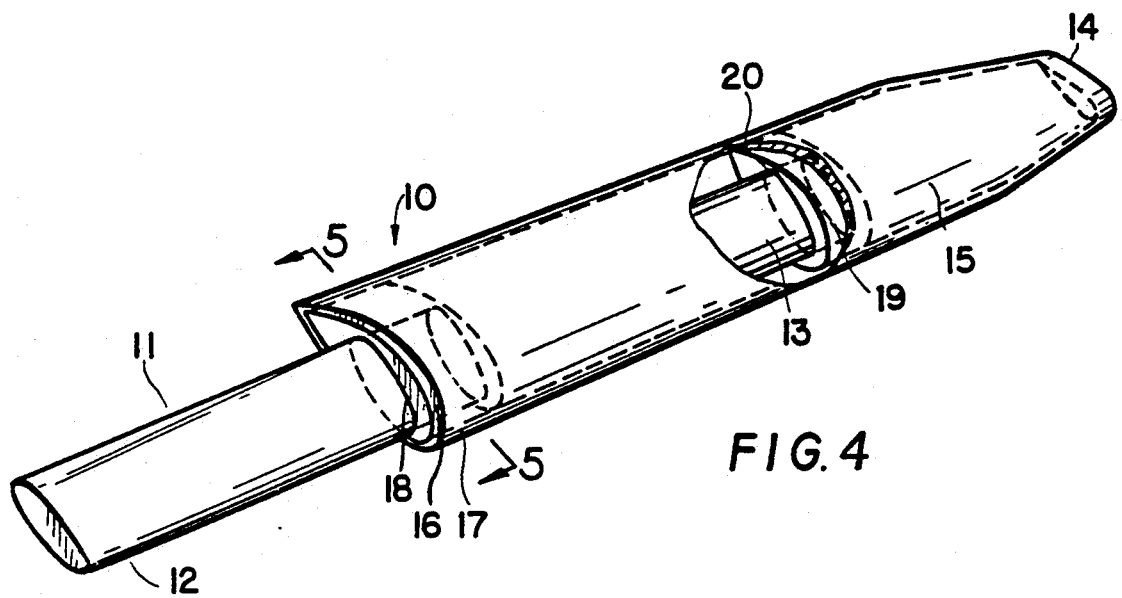

FIG. 4 is a view of the inventive blade having an offset at the transition region between the inboard and outboard sections.

Figure 5:
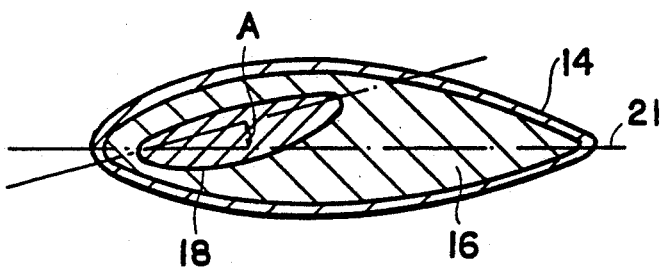

FIG. 5 is a view taken along line 5—5 of FIG. 4.

Figure 6:
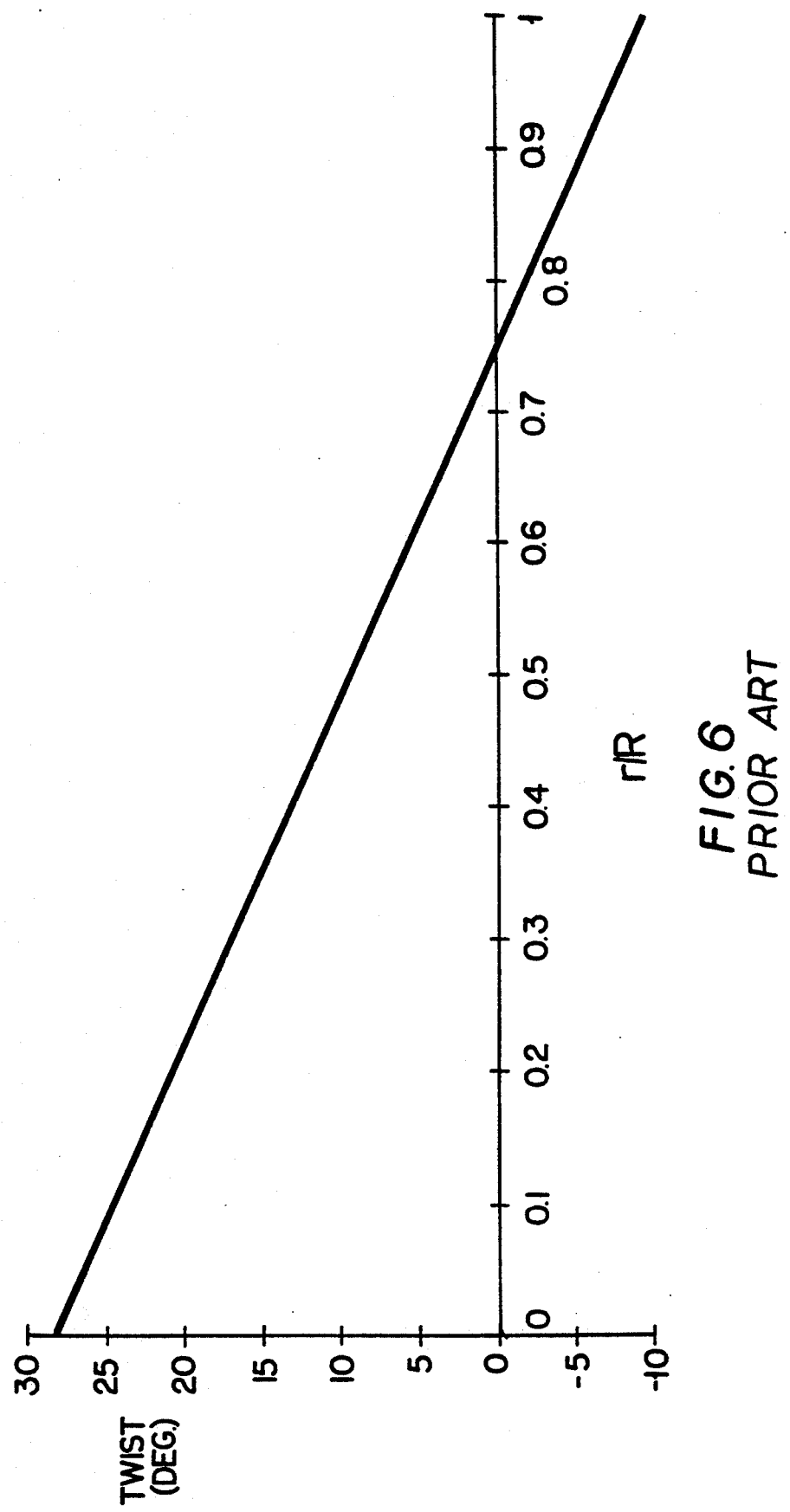

FIG. 6 is a baseline view of a prior art constant twist linear blade.

Figure 7:
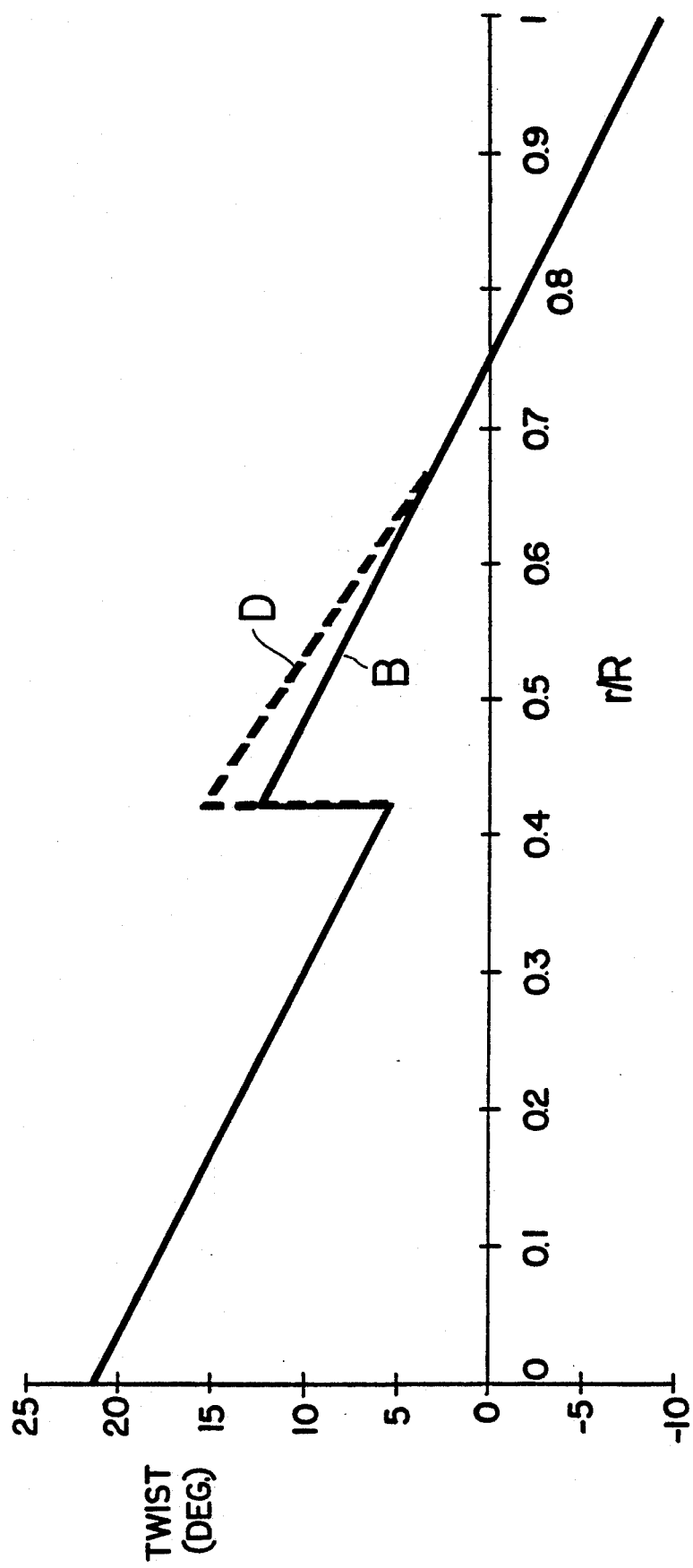

FIG. 7 is a baseline plot of the offset twist blade of the invention.

Figure 8:
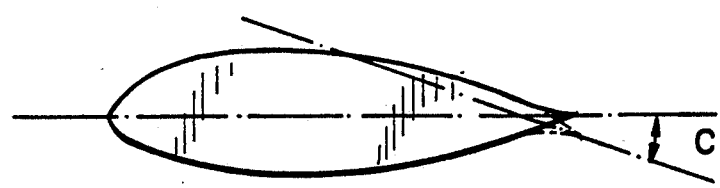

FIG. 8 is a cross section view of the outboard blade section showing the equivalent twist increment FIGS. 9a and b are perspective views of an extended blade showing the equivalent twist increment.

FIGS. 10a and b are cross sectional views showing the blade linear twist.

Figure 11:
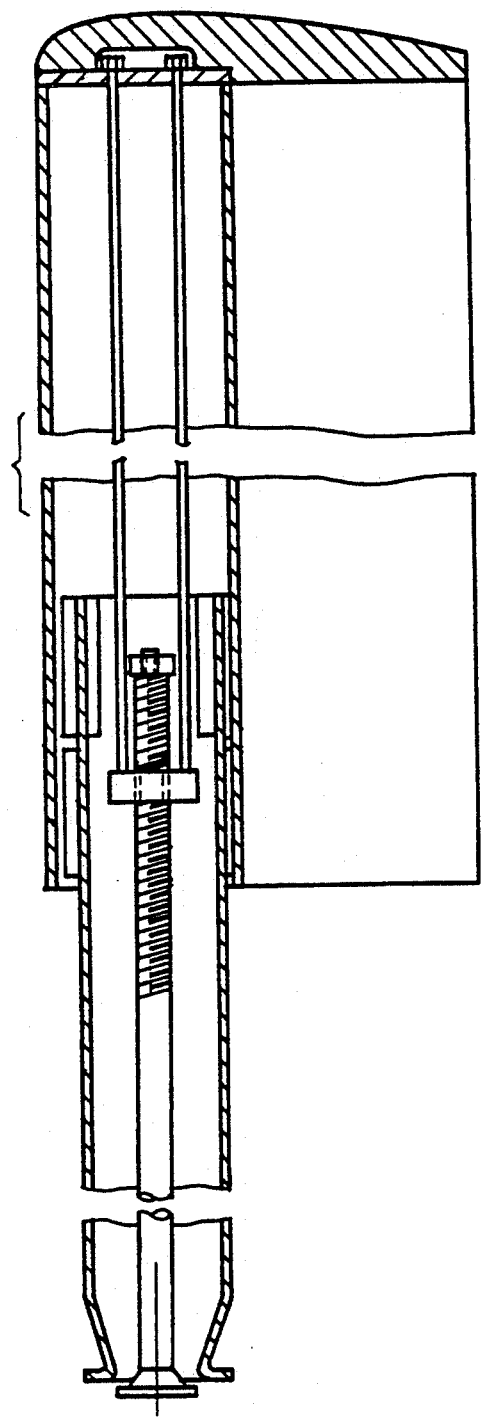

FIG. 11 is a plan view of a prior art blade showing a means for telescoping an outboard section relative to an inboard section of a blade.

DETAILED DESCRIPTION OF THE INVENTION

Referring to FIGS. 1a and 1b, an aircraft 1 has a pair of rotor pods 2 which may rotate from the horizontal plane to the vertical plane. Each pod has a rotor 3 supporting variable diameter blades 4. In FIG. 1a, the rotor blades are retracted for forward flight and in FIG. 1b, the rotor blades extended for hover flight. For illustrative purposes, each rotor has three blades though two or more blades may be used. For ease of illustration, the mechanisms for operating the variable diameter rotor system, such as the engine, transmission and gear drives system will not be discussed. Suffice it to say that such mechanism are known in the art as described in U.S. Pat. Nos. 4,142,697, 4,009,997, 3,884,594 and 3,713,751.

Typically, blade extension and retraction is driven by a threaded jackshaft which is rotated by a gear in the rotor hub. The jackshaft engages a threaded nut fixed in the outboard section by straps, such that rotation of the jackshaft either pulls the nut and outboard section in towards the hub or drives it out to increase the blade diameter. Of course, other means for providing a variable diameter rotor system for an aircraft may be used with the present invention.

Referring to FIG. 2, a prior art blade 5 is shown. The blade has an inboard section 6, an outboard section 7 which telescopes over the inboard section during extension into the maximum diameter configuration. FIG. 3a shows the linear angle of the inboard section, FIG. 3b shows the transition area where there is continuous linearity between the sections and FIG. 3c shows the cross section of the outboard section.

Referring to FIG. 4, the inventive variable diameter blade is shown. A blade 10 has an inboard section 11 with a linear twist which extends from a root end 12 of the inner section to an outboard end 13 thereof. An outboard section 14 has an inner blade receiving chamber 15 which telescopes over the inboard section 11 with the outboard section sliding over the inboard section. The outboard section has a bearing 16 which is fixed at an inboard end 17 thereof. The support bearing has a passage 18 through which the inboard section slides. The passage has a shape matching the shape of the inboard section. The inboard section has a similar support bearing 19 fixed at the outboard end thereof which translates within the outboard section receiving chamber. The bearing 19 has a complimentary passage 20 therein for receiving the outboard end 13 therein.

The bearing passages 18 and 20 determine the degree to which the offset twist is incorporated into the blade. Referring to FIG. 5, the bearing 16 has the passage 18 disposed at an offset angle A relative to axis 21 of the outboard section. Both bearing passages 18 and 20 are identical to properly incorporate an offset angle at the transition between the inboard and outboard sections. This provides a step change in the twist in the blade. For example, when in the fully extended condition, at the transition region, the inner section may have a linear twist angle of about 6° relative to the 75% radius station while the root end of the outboard section has a twist angle of about 14° relative to the same point. Preferably, an offset of from 4°–15° more preferably 5°–10° is incorporated in the inventive blade.

Referring to FIG. 6, a conventional linear twist base line drawing is shown for a typical variable diameter blade in the extended configuration. The twist angle is plotted versus the length of the blade, measured relative to the pitch angle at the 75% radius station. FIG. 7, line B by comparison shows the profile of the blade of the invention which has a twist offset at the transition between the inner and outer blade sections of about 7°.

Optionally, an additional degree of equivalent twist is provided to increase the offset. The equivalent twist increment is applied to the inner end of the outboard blade section and is achieved by rotation of the aft 30% of chord of the airfoil section through a specified angle with the deflection being a maximum at the root end of the outboard blade section and tapering linearly to 0° at a greater spanwise station. For example, referring to FIG. 8, the inboard end of the outboard section would have a trailing edge disposed at an angle C of about 5° relative to the blade axis. At the specified spanwise station, this twist would gradually reduce to 0° . The effective twist results in an increase in offset at the transition region of about 3°, shown by the dotted line D on FIG. 7. An equivalent twist of 2°–10°, preferably 3°–7°, may be used. FIGS. 9a and 9b are perspective views illustrating the trailing edge equivalent twist.

In a preferred embodiment of the invention, the inboard airfoil section has a pitch angle relative to the 75% radius station varying linearly from about 21° at the root to 6° at the outboard end. The juncture with the outboard airfoil section has an angle varying linearly from about 13° inboard to −10° outboard. The outboard airfoil additionally varies in camber along the trailing edge as shown by line D of FIG. 7 to effect an equivalent increase in the pitch angle of about 3° at the inboard end of the outboard airfoil.

The airfoil cross-section may be of any desired configuration and the blade section may be made of any appropriate material such as metal, i.e., aluminum or composite, i.e., graphite reinforced epoxy. Additionally, the outboard section can have various tip configurations beyond the inboard section receiving chamber to enhance performance. The tip region may have any desired distribution of twist, sweep, or taper to its airfoil section. For example, between 0.85 and 1.00 R, a linear taper may be incorporated to decrease induced drag, improve low speed climbout capability and improve fuel economy, as shown in FIGS. 9a and b.

The variable diameter blade of the invention permits construction of a rotor which operates in hover without stalling the inboard airfoil section, thus permitting efficient operation at high thrust/solidity ratios. Provision for a twist offset at the inner/outer blade junction permits operation of the rotor in forward flight at higher pitch angles to reduce negative lift and increase propulsive efficiency. Disk loading in hover is substantially reduced with the inventive blade, improving payload capability and reducing downwash velocity.

While preferred embodiments of the present invention have been shown and described, it will be understood by those skilled in the art that various changes or modifications could be made without varying from the scope of the present invention. For, example, instead of bearing support passages, an angled sleeve may be used to provide the offset twist of the invention.

We claim:

1. A variable diameter rotor blade comprising:
   an inboard airfoil section, an outboard airfoil section, means for telescoping the outboard section relative to the inboard section for varying the blade diameter,
   the inboard section having a linear twist from a root end to an outboard end thereof,
   the outboard section having a linear twist from a root end to an outboard end thereof and having a chamber therein for slidably receiving the inboard section,
   bearing means disposed within the chamber for supporting the inboard section, the bearing means having a passage, disposed at an offset angle relative to the plane of the outboard section, through which the inboard section is slidable, the outboard section being disposed at an offset twist relative to the inboard section in the amount of the offset angle to provide a twist transition between the inboard and outboard sections.

2. The variable diameter blade of claim 1 wherein the outboard section has a camber on a portion of a trailing edge thereof from the inboard to outboard end, to effect an equivalent increase in the offset twist at the transition between the inboard and outboard sections.

3. The variable diameter blade of claim 1 wherein the inboard section has a twist angle relative to the horizontal plane varying linearly from about 21° to about 6° from a root end to an outboard end thereof.

4. The variable diameter blade of claim 1 wherein the outboard section has a twist angle varying linearly from about 13° at an inboard end to −10° at an outboard end thereof.

5. The variable diameter blade of claim 1 wherein the offset at the transition is at an angle of from 4° to 15°.

6. The variable diameter blade of claim 1 wherein the bearing means comprise a pair of support bearings disposed in the chamber, each bearing having a passage therein for supporting the inboard section therein, the passages being disposed at an offset angle of from 4°–15° relative to a horizontal plane of the outboard section for providing an offset twist between the inboard and outboard sections.

7. The variable diameter blade of claim 1 further comprising a tapered tip region located on the outboard end of the outboard section, beyond the inboard section receiving chamber.

8. The method for increasing propulsive efficiency in a variable diameter rotor blade comprising:
   providing a variable diameter blade having an inboard airfoil section, an outboard airfoil section, means for telescoping the outboard section relative ro the inboard section for varying the blade diameter, and locating the outboard section at an offset twist relative to the inboard section to provide a twist transition between the inboard and outboard sections.

9. The method of claim 8 wherein the outboard section is located relative to the inboard section at an offset twist angle of from about 4° to 15°.

* * * * *